United States Patent [19]

Muehl

[11] 4,024,983

[45] May 24, 1977

[54] SAFETY LOCKING COVER ASSEMBLY FOR TANK DOMES

[76] Inventor: Herman D. Muehl, 10851 Drury Lane, Lynwood, Calif. 90262

[22] Filed: Dec. 22, 1975

[21] Appl. No.: 643,522

[52] U.S. Cl. .............................. 220/316; 220/318; 220/222; 292/257; 292/259 R
[51] Int. Cl.² ........................................ B65D 45/00
[58] Field of Search ............ 292/115, 64, 259, 257, 292/218, DIG. 32, DIG. 65, 256.5; 220/326, 324, 203, 316, 318, 222

[56] References Cited

UNITED STATES PATENTS

| | | | |
|---|---|---|---|
| 610,720 | 9/1898 | Peacock | 292/259 |
| 1,233,028 | 7/1971 | Clifton et al. | 220/203 |
| 1,339,905 | 5/1920 | O'Connor | 292/218 |
| 1,800,715 | 4/1931 | Clausen | 220/326 |
| 1,935,226 | 11/1933 | Jensen | 292/257 |
| 2,093,624 | 9/1937 | Thwaits et al. | 220/244 |
| 2,318,151 | 5/1943 | Gary | 220/324 |
| 2,776,070 | 1/1957 | Phillips | 220/203 |
| 2,783,913 | 3/1957 | De Frees | 292/259 |
| 2,793,786 | 5/1957 | Walker | 220/326 |

*Primary Examiner*—William Price
*Assistant Examiner*—Allan N. Shoap
*Attorney, Agent, or Firm*—Fulwider Patton Rieber Lee & Utecht

[57] ABSTRACT

A safety locking cover assembly for the dome of a tank truck of the type adapted to carry inflammable liquids. A cover is hinged upon a base attachable to the tank dome, and is moved between opened and closed positions by upward pivotal movement of a semicircular handle. The opposite ends of the handle pivot upon a locking bar extending beneath the cover top. The ends of the bar project from opposite sides of the cover and extend into recesses in catches mounted to the base, thereby normally preventing upward movement of the cover relative to the catches. However, the catches are spring biased against the base and are upwardly movable against the spring bias by high internal tank pressures. This provides a relatively large vent opening to vent the tank despite the fact that the handle may be closed. The cover can be manually opened by pivoting the handle through a 180° arc. This moves the locking bar downwardly relative to the catches on the base. This allows limited upward vertical movement of the locking bar and cover relative to the catches and any slight buildup of internal tank pressure is relieved before the cover is hinged upwardly to its open position. Movement of the pivoted handle circumferentially in the plane of the cover positions the locking bar out of alignment with the restraining catches and the cover can be hingedly moved to an open position. Alternative rapid mounting and demounting means for the tank dome are also disclosed.

5 Claims, 9 Drawing Figures

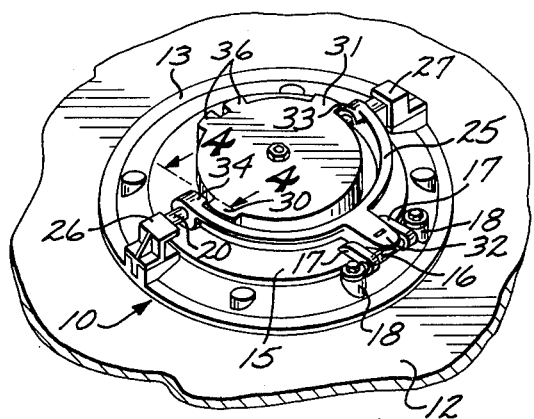
FIG. 1
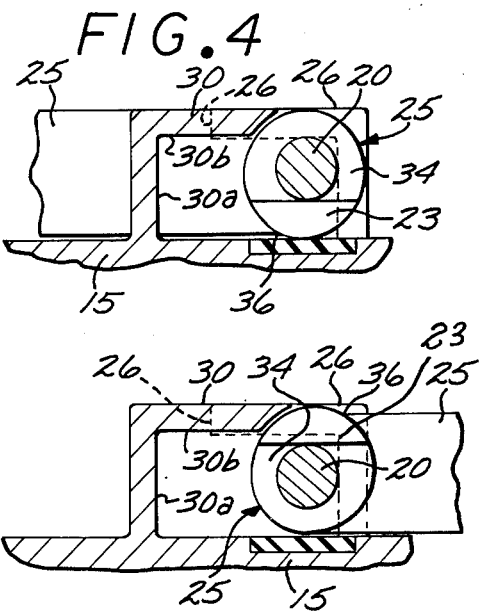
FIG. 4
FIG. 5
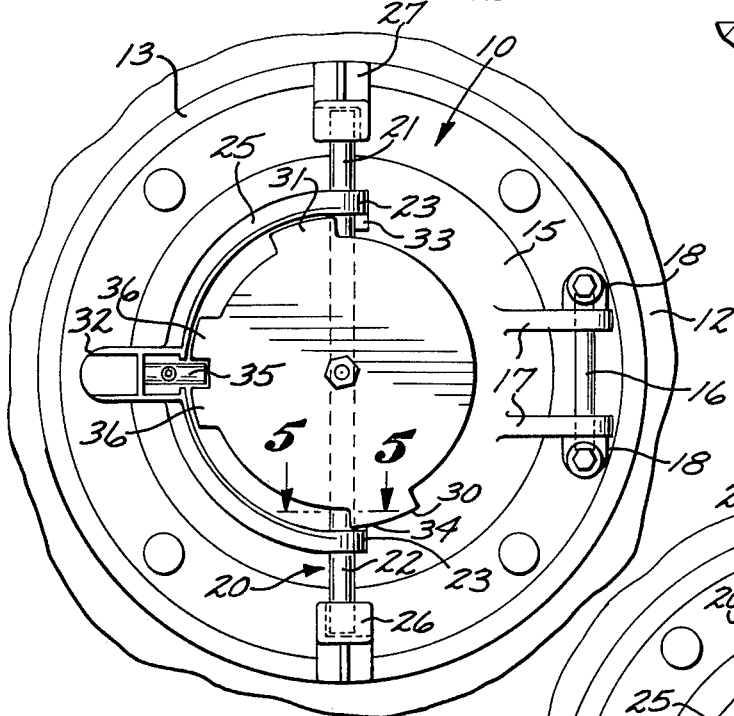
FIG. 2
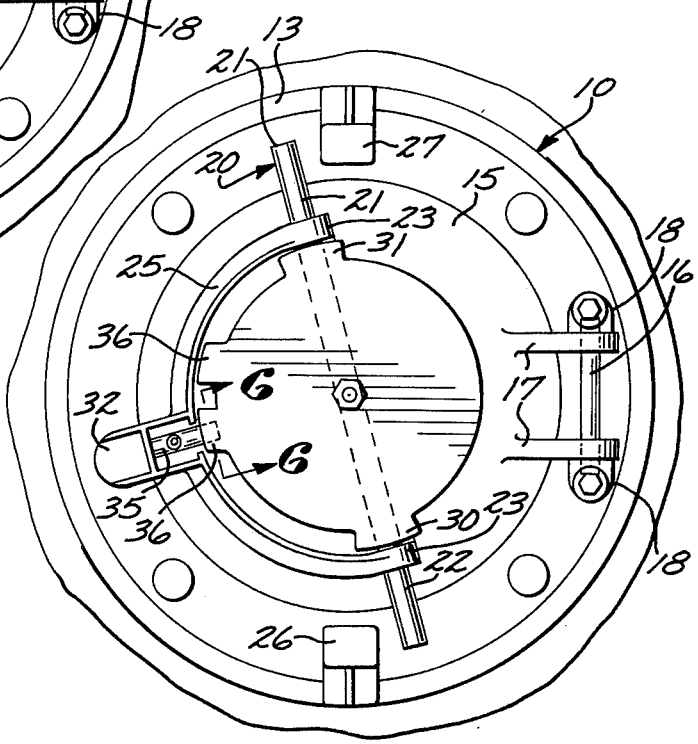
FIG. 3

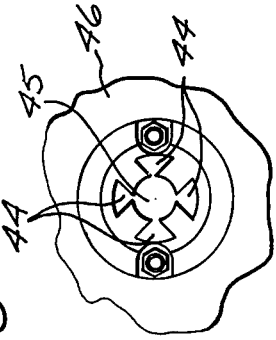
FIG. 8
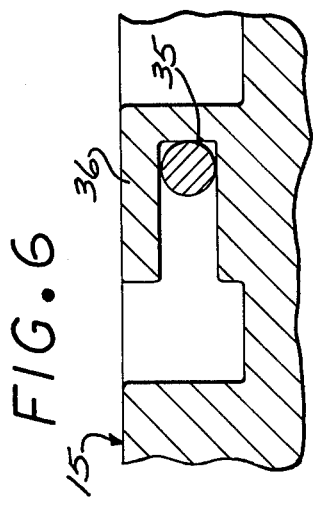
FIG. 6
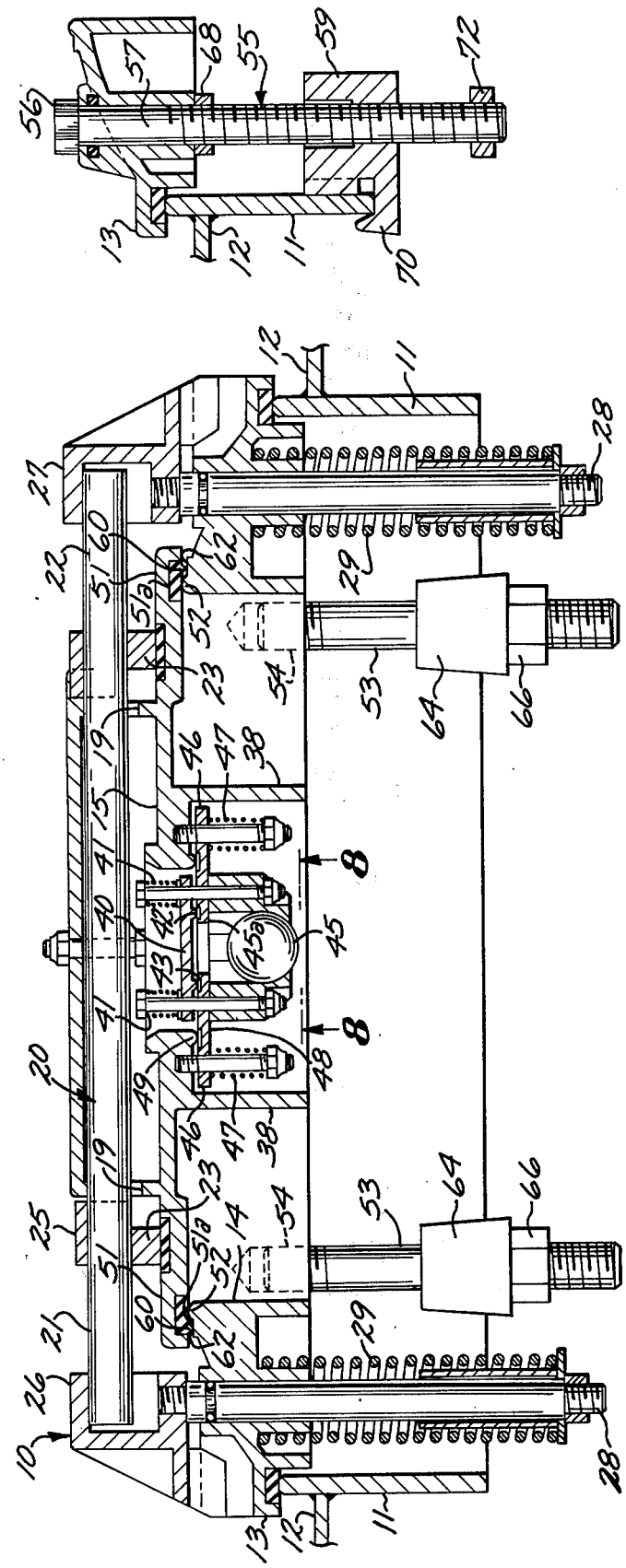
FIG. 9
FIG. 7

SAFETY LOCKING COVER ASSEMBLY FOR TANK DOMES

BACKGROUND OF THE INVENTION

1. Field of the Invention

The invention relates to a locking cover assembly for tank domes of the type used on tank trucks which transport gasoline and other inflammable materials.

2. Description of the Prior Art

It is necessary for tank domes for tanker trucks to rapidly vent the tank upon development of pressures exceeding a predetermined value.

The tank dome, which covers the filling opening in the tank, normally projects above the tank and is surrounded by guard rail to protect it from damage, particularly if the truck should overturn in an accident. It is desirable for various reasons to keep the height of the projecting dome as low as possible.

A conventional tank dome includes an annular base adapted for engagement upon the upper edge of a cylindrical ring welded within an opening in the tank. The liquids are introduced through the central opening in the base to fill the tank. The safety locking assembly of the present invention is adapted to be mounted to the tank dome to permit the desired venting and filling operations.

State and Federal regulations require that a tank dome be capable of adequately venting a tank to protect it from the effects of both vacuum and excessive pressures. Consequently, the conventional tank dome includes both a vacuum relief valve and a pressure relief valve in the cap, each of the valve being biased to a closed position by a compression spring or the like. Upon development of a vacuum of predetermined magnitude in the tank, the vacuum relief valve automatically opens to vent air into the tank. Similarly, the pressure relief valve vents air from the tank to the outside whenever pressures develop in the tank above a predetermined value.

The vacuum and pressure relief valves are sufficient to handle moderate pressure drops and rises in the tank. For higher pressure rises, the conventional dome mounts the cap in such a way that the cap itself can be opened for venting. More particularly, the cap is mounted to a bridge element which is pivotally carried by the base. The cap mounting mechanism includes a bias element or spring which urges the cover into its seated or closed position but which permits the cap to rise against the bias of the spring to vent extraordinary pressures in the tank. This venting action normally occurs during a fire, explosion or other emergency condition. Unfortunately, the venting capacity of the cap is limited by the size of the cap, and the upward travel of the cap is in turn limited by the space available between the base and the bridge element upon which the cap is mounted. Consequently in order to increase the venting capacity of the cap to conform to government specification, some manufacturers have raised the bridge element to provide more room for upward travel of the cap. However, the added height of the dome structure above the tank means that the height of the surrounding guard rail also has to be increased, which is undesirable for various reasons.

Another system for increasing the capacity for venting a tank is disclosed in my U.S. Pat. No. 3,365,096, issued Jan. 23, 1968, and entitled TANK CLOSURE ASSEMBLY. In that patent a base is described which is spring mounted to the peripheral ring which is welded to the tank. The base, which mounts the cover assembly, is adapted to move upwardly relative to the peripheral tank ring to vent excessive pressures developed in the tank during an emergency. Thus, the capability of the base for such upward movement compensates for the inability of the cover to move upwardly, the cover movement being limited by the space available between the base and the overlying cover bridge or lock which normally maintains the cover in its pivotally closed position.

SUMMARY OF THE INVENTION

According to the present invention, a safety locking cover assembly is provided whihc includes an opening handle pivoted to a locking bar which is carried by the cover and engages diametrically oppositely disposed catches spring mounted to a base. In the fully closed position of the handle the locking bar prevents upward movement of the cover. However, the catches themselves are movable upwardly, permitting the cover to move upwardly, upon development of tank pressures against the cover sufficient to overcome the spring bias of the mountings between the catches and the base. The handle locking system which overlies the cover moves with the cover during such venting, and consequently it does not present an obstacle to upward movement of the cover. This greatly increases the venting capacity of the cover, as compared with covers of the prior art.

In addition, the present safety locking assembly provides a two-stage opening action. The handle is pivotable through a 180° arc, from one side of the cover to the other, into a first stage or semi-open position. In this position camming means on the handle move the locking bar downwardly relative to the catches on the base. This permits limited upward movement of the cover to vent any pressure build-up which may have occurred in the tank. Venting of pressure at this time prevents injury to personnel pivoting the cover to its fully open position. Movement of the handle circumferentially relative to the cover moves the locking bar out of interfering relation with the mounting catches, and the handle can be raised to lift the cover to its fully open position.

Thus, the handle must be moved in sequence, and in two different planes, to open the cover, with venting occurring prior to the final or opening movement. Consequently, accidental or inadvertent opening of the cover is very unlikely, and injury to personnel from any build-up in tank pressure is also remote.

Accordingly, the present invention provides a locking cover assembly for tank domes which is an improvement over the prior art in that it provides greater safety for truck personnel operating the cover assembly.

The present cover assembly is relatively easy to operate and affords rapid access to the tank interior. The assembly is also relatively economical to manufacture and is adapted to be used with tanks of various volumes without any need for auxiliary venting capacity. The unobstructed upward movement of the cover under high internal tank pressures provides a relatively high venting capacity.

Other objects and features of the invention will become apparent from consideration of the following description taken in connection with the accompanying drawings.

BRIEF DESCRIPTION OF THE DRAWINGS

FIG. 1 is a perspective view of a portion of a tank truck dome, with the present safety locking cover assembly illustrated in its fully closed position;

FIG. 2 is an enlarged top plan view of the cover assembly of FIG. 1, with the handle moved from the fully locked position of FIG. 1 to a first stage, semi-open position;

FIG. 3 is a view similar to FIG. 2, but with the handle moved to a second stage, fully open position in which the cover can be upwardly pivoted to its fully open position;

FIG. 4 is an enlarged detail view taken along the line 4—4 of FIG. 1;

FIG. 5 is an enlarged detail view taken along the line 5—5 of FIG. 2;

FIG. 6 is an enlarged detail view taken along the line 6—6 of FIG. 3;

FIG. 7 is an enlarged transverse cross-sectional view of the structure of FIG. 1;

FIG. 8 is an enlarged detail view taken along the line 8—8 of FIG. 7; and

FIG. 9 is a partial transverse cross-sectional view of an alternative clamp assembly for attachment of the locking cover assembly to the tank structure.

DESCRIPTION OF THE PREFERRED EMBODIMENT

Referring now to the drawings, there is illustrated a tank dome 10 adapted for association with the usual cylindrical ring 11 which is welded to the truck tank 12. Only a portion of the tank 12 is illustrated. The tank dome 10 is particularly adapted for use in tank trucks designed to carry gasoline and other inflammable liquids. Transport of such materials requires a relatively high tank venting capacity for emergency conditions such as fire and the like.

The tank dome 10 comprises, generally, a circular base 13 having a central opening 14; a cover 15 normally seated upon the base 13 and closing the central opening 14. The cover 15 includes a pair of spaced apart lugs 17 through which is disposed a hinge pin 16. The opposite ends of the hinge pin 16 extend into a pair of vertically elongated slots (not shown) defined by a pair of trunnions 18 integral with the base 13. The slots in the trunnions 18 rotatably receive the pin 16, but also allow the pin 16 to move upwardly to a limited extent, permitting the adjacent edge of the cover 15 to raise for venting purposes, as will be seen.

An elongated dome locking bar 20 extends diametrically through openings 19 in opposite sides of the cover 15 and its opposite ends 21 and 22 protrude beyond the periphery of the cover 15. The openings 19 are laterally elongated, and also relatively large. This allows limited vertical and lateral movements of the locking bar 20 relative to the cover 15, the purposes of which will become apparent later.

The opposite camming ends 23 of a semi-circular handle 25 rotatably receive the ends 21 and 22 of the locking bar 20 in eccentric relation relative to the central axis of the ends 21 and 22. Then when the handle 25 is moved in a 180° arc across the top of the cover 15, the camming ends 23 pivot upon the bar ends 21 and 22. The off-center or eccentric mounting of the bar ends 21 and 22 lowers the ends 21 and 22 relative to the cover 15, as the handle 25 moves from its position in FIG. 1 to its position in FIG. 2.

The bar ends 21 and 22 are rotatably received within C-shaped recesses, respectively, of a pair of locking bar catches 26 and 27. These catches 26 and 27 are each threadably mounted to the upper end of a stud 28 which vertically slidably extends through a suitable vertical opening extending through the base 13. A washer held in place by a nut threaded to the bottom of the stud 28 bears against one end of a compression spring 29 mounted about the stud 28. The opposite end of the spring 29 bears against the base 13 and thereby strongly biases the catches 26 and 27 downwardly against the base 13. However, as will be seen, development of high internal tank pressure is operative to urge the cover 15 upwardly. This is transmitted by the locking bar 20 to the catches 26 and 27. The upper walls of the catches 26 and 27 which normally constrain the bar ends 21 and 22 against vertical upward movement, move upwardly against the bias of the springs 29 when the internal tank pressure reaches a predetermined prohibitive level, such as approximately 3 psi (gauge).

The catches 26 and 27 each have one closed vertical side and one open vertical side. The closed sides prevent circumferential clockwise movement of the locking bar 20 in a horizontal plane, as viewed in FIGS. 2 and 3, while the open sides permit movement in a counterclockwise direction.

A pair of flange stops 30 and 31 integral with the cover 15 extend radially outwardly from diametrically opposite sides of the cover 15. The flange stops 30 and 31 are slightly offset circumferentially relative to the handle camming ends 23, and are L-shaped in cross-section, as shown in FIGS. 4 and 5. The L-shape defines vertical closed sides 30a and 31a, and horizontal closed tops 30b and 31b, respectively.

When the cover 15 and handle 25 are in their fully closed positions, as seen in FIG. 1, the handle 25 extends toward the hinge pin 16. A safety latch 32 integral with the mid-portion of the handle 25 overlies the hinge pin 16 in this closed position of the handle 25. Moreover, in this position, the locking bar ends 21 and 22 underlie the closed upper walls of the locking bar catches 26 and 27. Also, the eccentric mounting of the locking bar 20 relative to the central axis of the handle camming ends 23 causes the camming ends 23 to forcibly press down upon the adjacent cover 15, providing a tight seal between the cover 15 and the base 13. The character of this seal will be described in more detail subsequently.

In the position of the components, as illustrated in FIG. 1, the location of the locking bar ends 21 and 22 within the locking bar catches 26 and 27 prevents upward vertical movement of the locking bar 20, and consequently prevents upward vertical movement of the cover 15. However, as previously indicated, generally vertical upward movement of the catches 26 and 27 occurs under high tank pressures and this permits the cover 15 to raise in an emergency, despite the just-described fully closed position of the handle 25.

Also, in the orientation of the parts in the condition illustrated in FIG. 1, the handle 25 is constrained against rotational or circumferential movement in the horizontal plane of the cover 15 by engagement between the flange stops 30 and 31 and a pair of semi-cylindrical stops 33 and 34. The stops 33 and 34 are integral with and disposed inwardly of the handle camming ends 23 and 24, as best seen in FIGS. 1 and 4, and engage the adjacent tops 30b and 31b of flange stops 30 and 31. This prevents counterclockwise movement of the handle 25.

When the handle 25 is pivoted from its fully closed position of FIG. 1 to the position illustrated in FIG. 2, two things occur. One, the semi-cylindrical stops 54 and 33 are rotated so that they are lower than the tops 30b and 31b of the flange stops 30 and 31, and this frees the handle 25 for counterclockwise rotation from the position of FIG. 2 to that illustrated in FIG. 3, that is, the stops 34 and 33 move below and underlie the flange tops 30b and 31b.

The second thing which occurs when the handle 25 is rotated about a neutral axis from the position of FIG. 1 to that of FIG. 2 is that the handle camming ends 23 also rotate and they orient the locking bar ends 21 and 22 downwardly of and in spaced relation to the overlying upper portions of the locking bar catches 26 and 27. This clearance allows the cover 15 to raise slightly to vent any internal pressures which may have built up in the tank. The raising of the cover 15 in this situation is also facilitated by the vertically elongated mounting openings in the trunnions 18 which receive the hinge pin 16.

The position of the handle 25 in FIG. 2 constitutes a first stage or semi-open condition in which the cover 15 cannot be pivoted fully open, but in which position any internal pressure in the tank is vented. Consequently, personnel cannot be injured by upward pivotal movement of the cover 15 under significant internal pressure.

As previously indicated, when the handle 25 is rotated about a vertical axis from the position of FIG. 2 to that of FIG. 3, the locking bar ends 21 and 22 move out of interfering engagement with the catches 26 and 27, and the handle stops 33 move beneath the flange stops 30 and 31. In addition, a radially inwardly directed pin 35, which is mounted to the safety latch 32, moves with the handle 25 from an open space defined between a pair of lifting flanges 36 to a position beneath one of such flanges. The flanges 36 are integral with and extent radially outwardly of the cover 15. With the pin 35 aligned with the open space between the flanges 36, upward pivotal movement of the handle 25 is ineffective to raise the cover 15. However, with the pin 35 located below a flange 36, raising of the handle 25 causes the pin 35 to engage and lift the flange 36 and upwardly pivot the cover 15 about the horizontal axis of the hinge pin 16.

Closure of the cover 15 is achieved in the reverse order. That is, the cover 15 is first pivoted shut, the handle 25 is next rotated about a vertical axis in a clockwise direction from the position of FIG. 3 to that of FIG. 2, and the handle 25 is then pivoted about a horizontal axis from its position of FIG. 2 to that of FIG. 1.

The cover 15 includes a vacuum relief valve to vent air into the tank 12 during pressure fluctuations of relatively small magnitude, such as might be occasioned upon withdrawing liquid from the tank 12. The vacuum valve includes a vacuum relief plate 46 which is normally urged upwardly by coil springs 47. This brings a gasket 48 on its upper surface into sealing engagement with a downwardly directed annular shoulder 49 formed on the underside of the cover 15. When a vacuum develops within the tank, the vacuum relief plate 46 is drawn downwardly and permits air to enter the tank through the opening between the gasket 48 and shoulder 49.

The cover assembly is also provided with a pressure relief valve to vent tank pressures which have reached approximately 1 psi (gauge). The valve includes a pressure relief plate 40 disposed above the vacuum relief plate 46. The plate 40 is urged downwardly by coil springs 41, seating an annular shoulder 42 thereof in sealing engagement with a gasket 43 provided on the upper surface of the plate 46. When pressure develops in the tank, which often occurs during transportation of the contained liquid, air is vented past radial openings 44 located around a ball 45, as seen in FIGS. 7 and 8. The pressure build-up urges the relief plate 40 upwardly, and the internal pressure is relieved through the opening which develops between the shoulder 42 and gasket 43.

The above-described pressure and vacuum itself valves open and close automatically to compensate for minor variations in the pressure within the tank.

In the event that the tank overturns, the ball 45 prevents the tank contents from raising the plate 40 and pouring out of the tank. The ball 45 moves under the force of gravity against an annular shoulder 45a provided in the center of plate 46, closing off the openings 44.

The structure of the present safety locking assembly is thus capable of venting air into and out of the tank 12 during pressure fluctuations of relatively small magnitude. In addition, the semi-open or first stage position of the locking handle 25 frees the cover 15 for venting of internal tank pressure prior to subsequent rotational movement of the handle 25 about a vertical axis to a position in which the cover 15 can be pivotally raised by the handle. Moreover, during such venting the cover 15 will be raised and the handle 25 cannot easily be rotated to the fully open position of FIG. 3 since the locking bar ends 21 and 22 will be forcibly urged against the upper portions of the catches 26 and 27.

At any time that tank pressures reach approximately 3 psi (gauge) or higher, as would occur during a fire or the like, the cover 15 is movably upwardly with the catches 26 and 27 against the bias of the springs 50, regardless of the position of the handle 25. Since no immovable structure overlies the cover 15, upward movement of the cover is relatively unrestricted. Consequently, relatively high venting capacity is provided. In one embodiment of the invention, the capacity ranges as high as 627,976 cubic feet of air per hour at an internal tank pressure of 5 psi (gauge).

Sealing engagement between the cover 15 and the base 13 is provided by a double seal arrangement. More particularly, the base 13 is provided with an annular, upwardly projecting shoulder 52 which seals against an annular gasket 51 carried in the underside of the cover 15. It has been found that the shoulder 52 is sometimes nicked and deformed after long service, which adversely affects the seal. Consequently, a double seal action is provided by configuring the gasket 51 to include a downwardly extending integral lip 60 which presses against an annular horizontally oriented flat 62 located radially outwardly of the shoulder 52, as best seen in FIG. 7.

As best seen in FIGS. 1 and 7, the base 13 includes four vertically oriented mounting studs 53 which are threaded at their upper ends into suitable threaded openings 54 in the base 13. Each stud 53 vertically slidably mounts a clamp lug 64 having a radially outwardly extending lip (not shown) adapted to underlie and receive the lower edge of the tank ring 11. A nut 66 is located below each clamp lug 64. With the cover 15 open, a wrench can be inserted into the opening to turn the nut 66 and thereby forcibly urge the lips of the 5 clamp lugs 64 against the lower edge of the tank ring 11 and thereby securely clamp the assembly in position.

Occasionally it is important to be able to quickly demount the safety cover assembly from the outside of the base 13. Where this is the case, an optional form of clamping arrangement can be used which is illustrated in FIG. 9. In this arrangement the base 13 is provided with four openings which vertically slidably receive threaded studs 55 having hexagonal heads 56.

A friction nut 68 is threaded onto each stud 55 immediately below the base 13. A clamp lug 59 is threaded onto the lower extremity of each stud 55 below the nut 68. Each clamp lug 59 includes a radially outwardly extending lip 70 adapted to underlie the adjacent tank ring 11. Another friction nut 72 is threaded onto the lower end of each stud 55 below the adjacent clamp lug 59.

In mounting the base 13 to the tank 12 with the optional clamping arrangement of FIG. 9, the lugs 59 are rotated on the threads of the studs 55 until the lips 70 are located down far enough so that they are well below the ring 11 when the base 13 is fitted into position. With the base 13 resting on top of the ring 13, the nuts 56 can be rotated from outside the base 13 to rotate the lugs 59. This is continued until the lugs 59 impinge against the inner vertical surface of the ring 11. Further tightening of the nuts 56 brings the lips 70 upwardly into engagement with the lower edge of the ring 11 to thereby clamp the base 13 in position. Demounting of the cover 13 is simply a reversal of the previous operation.

Various modifications and changes may be made with regard to the foregoing detailed description without departing from the spirit of the invention.

I claim:

1. A safety locking cover assembly for mounting upon the peripheral ring defining the filling opening of a tank, said assembly comprising:
   a circular base for peripheral engagement upon the upper edge of said peripheral ring and including a central opening;
   a cover mounted to said base for pivotal movement about a horizontal axis, between an open position and a closed position in sealing relation over said central opening;
   clamping means on said base operative to maintain said peripheral engagement between said base and said ring;
   a plurality of catches on said base;
   spring bias means urging said catches against said base and thereby constraining said catches against upward movement; and
   locking means on said cover including elements normally engaged by said catches in said closed position of said cover to establish a locked condition preventing said pivotal movement of said cover to said open position, said cover, said locking means and said catches being upwardly movable together in said locked condition against the bias of said spring bias means upon development of a predetermined internal tank pressure against said cover, whereby said pressure is vented through said central opening while said cover, said locking means and said catches remain in said locked condition.

2. A cover assembly according to claim 1 wherein said catches each includes a top portion and a side portion, and wherein said locking means comprises:
   a handle overlying said cover and pivotable about a horizontal axis between a closed position and a semi-open position, and rotatable on said cover about a vertical axis between said semi-open position and a fully open position;
   a locking bar carried by said cover, pivotally mounting said handle, and including extremities received within said catches in said closed and semi-open positions of said handle, thereby preventing said locking from moving upwardly past said catches, whereby said cover cannot be pivoted to its said open position; and wherein said cover and said handle include means interchangeable in said fully open position of said handle whereby pivotal movement of said handle upon said locking bar is operative to pivot said cover to said open position of said cover.

3. A cover assembly according to claim 2 wherein said handle includes stops and said cover includes complemental stops, said stops and complemental stops being configured and arranged to engage in said closed position of said handle and thereby prevent movement of said handle from said closed position of said handle to said open position of said handle, and to disengage in said semi-open position of said handle and thereby permit movement of said handle from said semi-open to said fully open position of said handle.

4. A cover assembly according to claim 2 wherein said handle includes camming means engageable with said cover in said closed position of said handle to forcibly urge said locking bar extremities against said top portions of said catches thereby to press said cover against said base and establish said sealing relation, said camming means being located closer to said cover is said semi-open and fully open positions of said handle thereby to locate said locking bar extremities in spaced relation below said top portions of said catches whereby said cover is upwardly movable relative to said base the amount of said spacing between said locking bar extremities and said top portions.

5. A cover assembly according to claim 1 wherein said clamping means comprise a plurality of headed, threaded studs carried by said base and sufficiently elongated to terminate below the lower edge of said peripheral ring; a plurality of clamp lugs threadably carried by said studs, respectively, each of said lugs including a lip adapted to underlie said base lower edge whereby rotation of said studs from externally of said base is operative to threadably urge said lugs into engagement with said base to urge said base downwardly upon said peripheral ring.

* * * * *

UNITED STATES PATENT OFFICE
CERTIFICATE OF CORRECTION

Patent No. 4,024,983    Dated May 24, 1977

Inventor(s) HERMAN D. MUEHL

It is certified that error appears in the above-identified patent and that said Letters Patent are hereby corrected as shown below:

Column 5, line 6, "54" should read --34--.

Signed and Sealed this sixteenth Day of August 1977

[SEAL]

Attest:

RUTH C. MASON  
*Attesting Officer*

C. MARSHALL DANN  
*Commissioner of Patents and Trademarks*